United States Patent
Bachtiger et al.

(10) Patent No.: US 11,848,010 B1
(45) Date of Patent: Dec. 19, 2023

(54) SYSTEMS AND METHODS FOR CREATING DYNAMIC FEATURES FOR CORRELATION ENGINES

(71) Applicant: VoiceBase, Inc., San Francisco, CA (US)

(72) Inventors: Walter Bachtiger, Novato, CA (US); Bruce Ramsay, Campbell, CA (US)

( * ) Notice: Subject to any disclaimer, the term of this patent is extended or adjusted under 35 U.S.C. 154(b) by 141 days.

(21) Appl. No.: 17/518,622

(22) Filed: Nov. 4, 2021

Related U.S. Application Data (63) Continuation-in-part of application No. 16/269,589, filed on Feb. 7, 2019, now abandoned.

(60) Provisional application No. 62/628,312, filed on Feb. 9, 2018.

(51) Int. Cl.
| | |
|---|---|
| *G10L 15/18* | (2013.01) |
| *G10L 15/30* | (2013.01) |
| *G06F 40/30* | (2020.01) |
| *G06F 40/166* | (2020.01) |
| *G10L 15/22* | (2006.01) |
| *G06F 40/295* | (2020.01) |

(52) U.S. Cl.
CPC ........ *G10L 15/1815* (2013.01); *G06F 40/166* (2020.01); *G06F 40/295* (2020.01); *G06F 40/30* (2020.01); *G10L 15/22* (2013.01); *G10L 15/30* (2013.01)

(58) Field of Classification Search
None
See application file for complete search history.

(56) References Cited

U.S. PATENT DOCUMENTS

| | | | | |
|---|---|---|---|---|
| 2008/0262828 | A1* | 10/2008 | Och | G06F 40/47 704/3 |
| 2012/0047174 | A1* | 2/2012 | Avner | G06F 40/205 707/777 |
| 2014/0142940 | A1* | 5/2014 | Ziv | G10L 17/00 704/235 |
| 2014/0337009 | A1* | 11/2014 | Kau | G06Q 10/107 704/9 |
| 2016/0350672 | A1* | 12/2016 | Snyder | G06N 20/00 |
| 2017/0339083 | A1* | 11/2017 | Pinel | G06F 40/253 |
| 2019/0108450 | A1* | 4/2019 | Byron | G06N 5/02 |

\* cited by examiner

*Primary Examiner* — Douglas Godbold (57) ABSTRACT

Systems for analyzing and categorizing audio content that has been transcribed into text are provided. The systems include at least one machine that has a central processing unit, random access memory, a correlation module, a feature abstraction module, and at least one database. The correlation module is configured to receive written transcripts (each of which has been generated from audio content) and derive a correlation between each written transcript and one or more attributes. The feature abstraction module is configured to receive instructions that identify specific words within the written transcripts; replace the specific words with surrogate words; and associate correlative meanings with each of the surrogate words. The database is configured to receive, record, and make accessible to the feature abstraction module a table of specific words, each of which is associated with corresponding surrogate words and correlative meanings associated with each of the surrogate words.

9 Claims, 5 Drawing Sheets

SYSTEMS AND METHODS FOR CREATING DYNAMIC FEATURES FOR CORRELATION ENGINES

CROSS-REFERENCE TO RELATED APPLICATIONS

This application is a continuation-in-part application of U.S. patent application Ser. No. 16/269,589, filed on Feb. 7, 2019, which is a non-provisional application of, and claims priority to, U.S. provisional patent application Ser. No. 62/628,312, filed on Feb. 9, 2018.

FIELD OF THE INVENTION

The field of the present invention relates to systems and methods for analyzing and categorizing transcriptions of audio content and, more particularly, to systems and methods for creating dynamic features for correlation engines, which are used to analyze and categorize transcriptions of audio content. In addition, the field of the present invention relates to systems and methods that are configured to identify different correlative meanings associated with specific words, when such words are used in different contexts.

BACKGROUND OF THE INVENTION

Today, various types of machines exist that are configured to derive correlations using sets of training data, which are typically separated into a first set that exhibits a particular trait and another set of data (which does not have the particular trait of the first set). Such correlation machines are routinely configured to determine the difference(s) between the two sets of data files—and to generate formulae and algorithms that can then be used to estimate (predict) whether unknown samples of data files do (or do not) have the particular trait (based on observed positive or negative correlations between the traits). Furthermore, models are often used with the trained correlations to estimate whether the trait exists in unknown samples; with adaptation to other correlations of other data sets requiring entirely different or additional training data (and, in many cases, retraining of additional correlation machines).

In this context, a training set of data must encompass significant variability in order to successfully analyze future unknown (sample) data files. Collecting a sufficiently large training set can be expensive and time consuming—and if the content is highly variable, such variability will often decrease the accuracy of future predictions. In many cases, such variability is highly-specific. In the case of data files in the form of audio recordings (or transcripts thereof), variation between groups of data sets (e.g., audio recordings) can be anticipated and defined in advance. For example, in the case of data sets consisting of audio recordings of person-to-person conversations, groups of words that have a positive correlation for one set of text files (i.e., transcriptions of the audio files) in one context can have a negative correlation for a closely related set (i.e., in a second context). That is, certain words will have different correlative meanings to a particular user of such data, depending on the context in which such words are used. In other cases, certain words may have consistently high positive or negative correlations—and are highly valuable and predictive for generating useful and accurate estimates of unknown samples. When training sets of data files collected from nearly identical (or highly-related) contexts are employed, these positive and negative correlations will sometimes cause highly-valuable words to be erroneously disregarded as insignificant.

For example, a correlation machine could be used to analyze text transcripts of calls to vendors to help identify the callers who represent the best sales prospects. In this example, certain words and phrases correlate well with all vendor conversations. For example, in the case of conversations with a car dealer, phrases such as "car+buy" and "in stock" will correlate with and be predictive of a good sales lead for any car dealer. However, other words—such as specific brand and model names—will have a positive correlation for dealers that sell those brands and a negative correlation for dealers that do not. In this example, to train a correlation machine for multiple car dealers, a very large number of examples (training data) would be required and, to some extent, the large number of examples (training data) could reduce the accuracy of the correlation machine due to the types of ambiguity mentioned above—e.g., certain brand- and model-specific words having positive or negative correlation for different car dealers.

With currently-available machines, the issue of positive and negative correlation requires either construction of independent correlation machines (with data files being separated based on the anticipated correlation) or, alternatively, a single and very large general model that incorporates metadata that could indicate the type of vendor (e.g., car dealer) a call involves to allow the model to determine which brands or models would be positively or negatively correlated. Such techniques present major challenges that have yet to be resolved today; such techniques require unduly large numbers of training data files (which must be collected) for all possible vendors and overcoming the dilutive effects of conflicting positive and negative correlations. To further complicate matters, in such example, brand and model names change over time, which requires ongoing replacement and retraining to preserve the accuracy of the correlation machines and the predictions such machines generate.

Accordingly, there is a continuing and growing demand in the marketplace for improved systems and methods that are configured to derive correlations between sample data files and various attributes, and particularly systems and methods that are configured to reduce the extent to which certain words (the relevance of which are context-dependent and/or user-dependent) are erroneously disregarded and/or discounted. As described further below, the present invention addresses many of those (and other) demands in the marketplace.

SUMMARY OF THE INVENTION

According to certain aspects of the present invention, systems for analyzing and categorizing audio content that has been transcribed into text are provided. The systems generally include at least one machine that has a central processing unit, random access memory, a correlation module, a feature abstraction module, and at least one database in communication with the machine. According to certain embodiments, the correlation module is configured to receive a plurality of written transcripts (each of which has been generated from audio content) and derive correlations between each written transcript and one or more attributes (or categories of content). For example, if a user of the system wishes to analyze conversations between prospective buyers of an automobile, and automobile dealers, and identify those conversations that are likely to lead to a sale (and those that are not), the system and its correlation module may be trained and used to identify those conversations with customers (based on transcriptions of such conversations) that are likely to lead to a sale (and those that are not).

The invention provides that the feature abstraction module is configured to receive instructions (from a user) that identify specific/actual words within the written transcripts; replace the specific/actual words with surrogate words; and associate correlative meanings with each of the surrogate words. Importantly, the replacement of specific words with surrogate words by the feature abstraction module enables the modified written transcripts to be used by multiple and different users of the system. In addition, the system is configured to associate different correlative meanings with the surrogate words, depending on the context in which the surrogate words are spoken—i.e., the correlative meanings associated with the surrogate words are context-dependent. For example, as explained above, the articulation of a specific brand (or model) name may be correlated with a desired likelihood of a sale in some contexts (e.g., if that brand or model name is offered by the vendor/user); whereas, the articulation of the same specific brand or model name may be correlated with a low likelihood of a sale in other contexts (e.g., if that brand or model name is offered by a competitor). Thus, whether the same brand or model name should be positively or negatively correlated depends on the identity of the user (i.e., whether the brand or model name is associated with the user or its competitor). The feature abstraction module of the present invention enables a user to dynamically assign generic/surrogate words (e.g., "myBrand" or "competitorBrand") to specific words (e.g., a particular brand or model name), along with corresponding correlative meanings. This way, the correlation module—when trained with data sets that have been modified by the feature abstraction module in this manner—may be employed by multiple and different users.

The database of the systems descried herein is configured to receive, record, and make accessible to the feature abstraction module a table of specific/actual words, each of which is associated with corresponding surrogate words and correlative meanings associated with each of the surrogate words. The invention provides that a user of the system may review, and make modifications as desired, to the table of specific/actual words through a graphical user interface of the system. In certain embodiments, the systems of the present invention are configured to associate specific/actual words with surrogate words (and surrogate words with corresponding correlative meanings) prior to, during, or following analysis by the correlation module of a plurality of written transcripts. The invention provides that such associations between specific/actual words and surrogate words may be based on known or anticipated correlative meanings (and such correlative meanings may be represented by either positive or negative values).

According to yet further aspects of the invention, the systems described herein may include a transcription module that is configured to receive a plurality of audio files generated by a plurality of different sources; execute speech-to-text transcriptions based on audio content included within the audio files; generate written transcripts of such transcriptions; and provide the written transcripts to the correlation module. The invention provides that the transcription module may be configured to execute speech-to-text transcriptions of recorded audio content—and the correlation module may be configured to derive a correlation between each written transcript and one or more categories of content (i.e., attributes) at any time thereafter. Alternatively, the transcription module may be configured to execute speech-to-text transcriptions of live audio content in real-time, with the correlation module also being configured to derive a correlation between each written transcript and one or more categories of content (i.e., attributes) in real-time, as the transcription module is executing such speech-to-text transcriptions.

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used, and made without departing from the scope and spirit of the invention.

Referring now to FIGS. 1-5, according to certain preferred embodiments of the present invention, systems and methods for analyzing and categorizing (assigning attributes to) transcriptions of audio content are provided and, more particularly, systems and methods for creating dynamic features for correlation engines, which are used to analyze and categorize transcriptions of audio content are provided. In certain embodiments, the systems of the present invention include a central processing unit (CPU) 10, random access memory (RAM) 12, a correlation module 14, a feature abstraction module 16, and a database 18—all operably connected and in communication with each other. In addition, in certain embodiments, the systems may further include a graphical user interface (GUI) 20, which is configured to display certain forms of system outputs as described herein (and is further configured to enable a user to interact with and instruct the systems described herein). The invention provides that the correlation module 14, feature abstraction module 16, and database 18 may exist within a single unified machine or, alternatively, within two or more separate machines in communication with each other.

Correlation Module

In certain preferred embodiments, the present invention provides a system and method for creating dynamic features that can be incorporated into a correlation engine, even after the correlation engine has been "trained" in a specific and desired context. More particularly, the invention provides that such dynamic features may be used to create a correlation module 14 that is trained for one specific set of data files (e.g., audio recordings and written transcripts thereof), while yet having application and utility in other contexts and with other sets of data files. For example, if a correlation module 14, as described herein, is trained using a set of data files that consists of written transcripts of audio content (consisting of prospective customer calls to a particular vendor), the systems and methods of the present invention will enable that same correlation module 14 to be used by other vendors (in connection with their own calls from prospective customers)—despite the fact that the correlation module 14 was not specifically trained for (and training data was not collected from) the other vendors.

Figure 1:
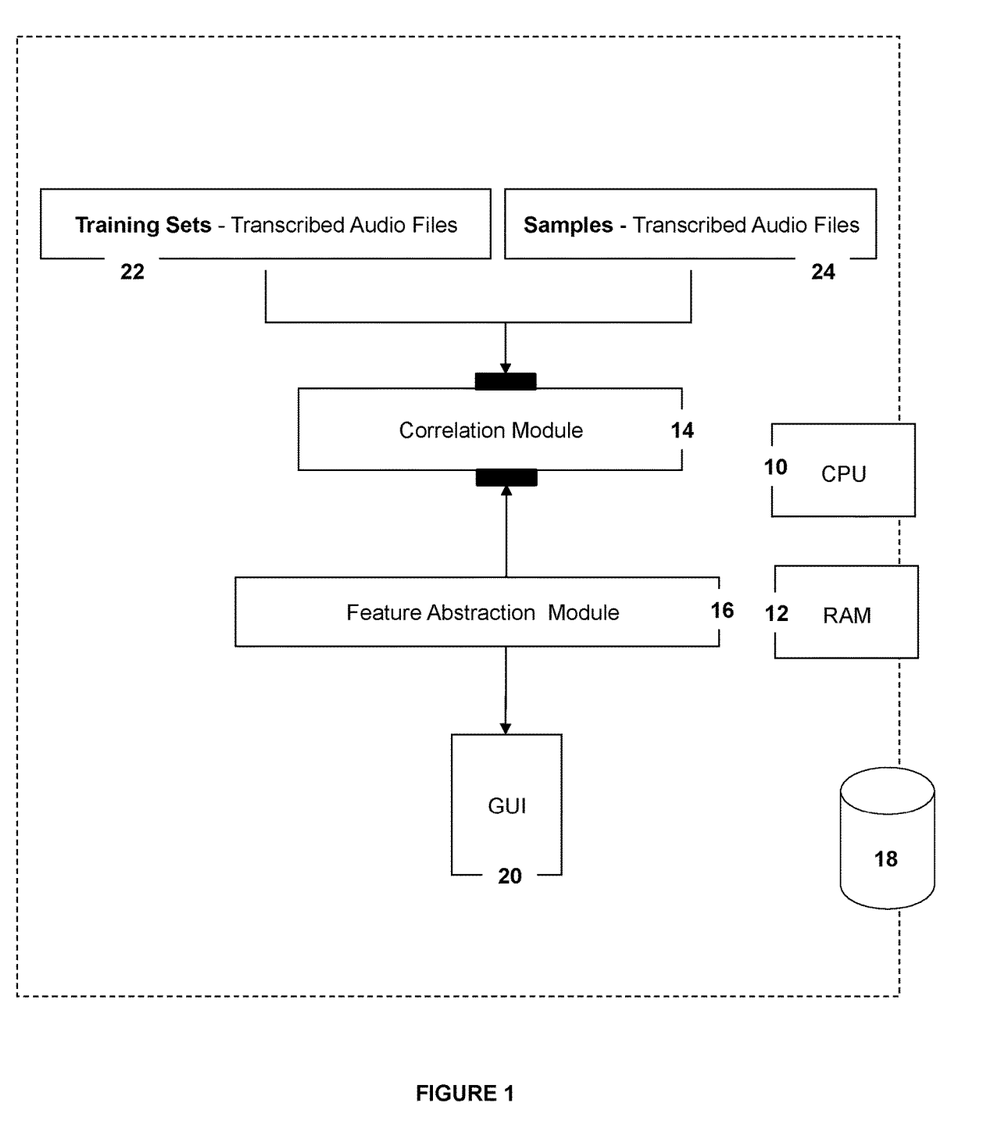
FIG. 1 is a diagram that illustrates the various components of the systems described herein, including the correlation module, feature abstraction module, and other components (e.g., the CPU, RAM, and database used in the systems of the present invention).

Referring to FIG. 1, in certain preferred embodiments, the invention provides that the correlation module 14 is configured to receive a plurality of written transcripts (each of which has been generated from audio content) and derive correlations between each written transcript and one or more categories of content (or attributes). For example, if a user of the system wishes to identify conversations between prospective buyers of an automobile, and automobile dealers, and identify those conversations that are likely to lead to a sale (and those that are not), the system and its correlation module 14 may be trained and used to identify those conversations with customers (based on transcriptions of such conversations) that are likely to lead to a sale (and those that are not). The correlation module 14 may initially be "trained" to calculate such determinations (and to build a correlation model that may be used to calculate such determinations) by first providing the correlation module 14 with a training set 22 of transcribed audio files.

For example, the training set 22 of transcribed audio files may consist of two subsets, namely, (1) a set of transcribed audio files involving prospective customers that are known to have proceeded to a sales transaction (a first category of content/a first attribute) and (2) a set of transcribed audio files involving prospective customers that are known to have not produced a sale (a second category of content/a second attribute). Using training sets 22 of transcribed audio files, the correlation module 14 is configured to derive correlations between the words, phrases, metadata, and other content present in each subset, and the category of content or attribute (sale/no sale) associated with each subset. Once trained in this manner, the correlation module 14 is configured to receive and derive correlations for samples 24 of transcribed audio files, i.e., new transcribed audio files for which it is unknown whether the transcribed audio files should be associated with a particular category of content/ attribute (e.g., sale/no sale).

The invention provides that the correlation module 14 may be configured to utilize any of various known algorithms to derive correlations between training sets 22 of transcribed audio files and various attributes (also referred to herein as "categories of content"). Non-limiting examples of such algorithms that may be used in such embodiments include, but are not limited to, algorithms commonly known as C4.5, k-means, SVM (support vector machines), Apriori, EM (expectation-maximization), AdaBoost, kNN (k-Nearest Neighbors), Naive Bayes, CART (classification and regression trees), and/or derivatives of any of the foregoing algorithms.

Feature Abstraction Module

Figure 2:
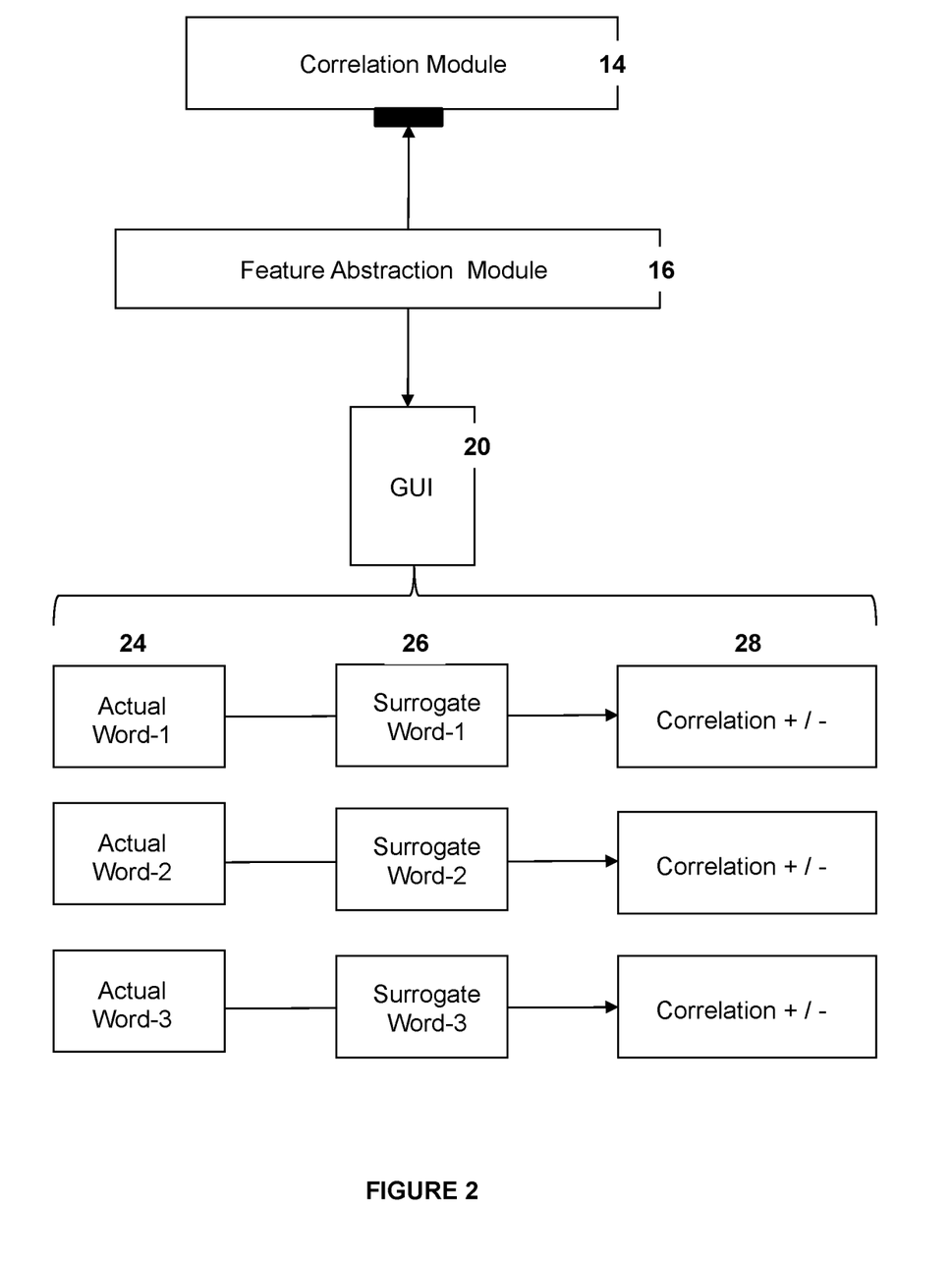
FIG. 2 is a diagram that illustrates the association between actual/specific words detected by the system, surrogate words, and correlative meanings assigned to the surrogate words.
Figure 3:
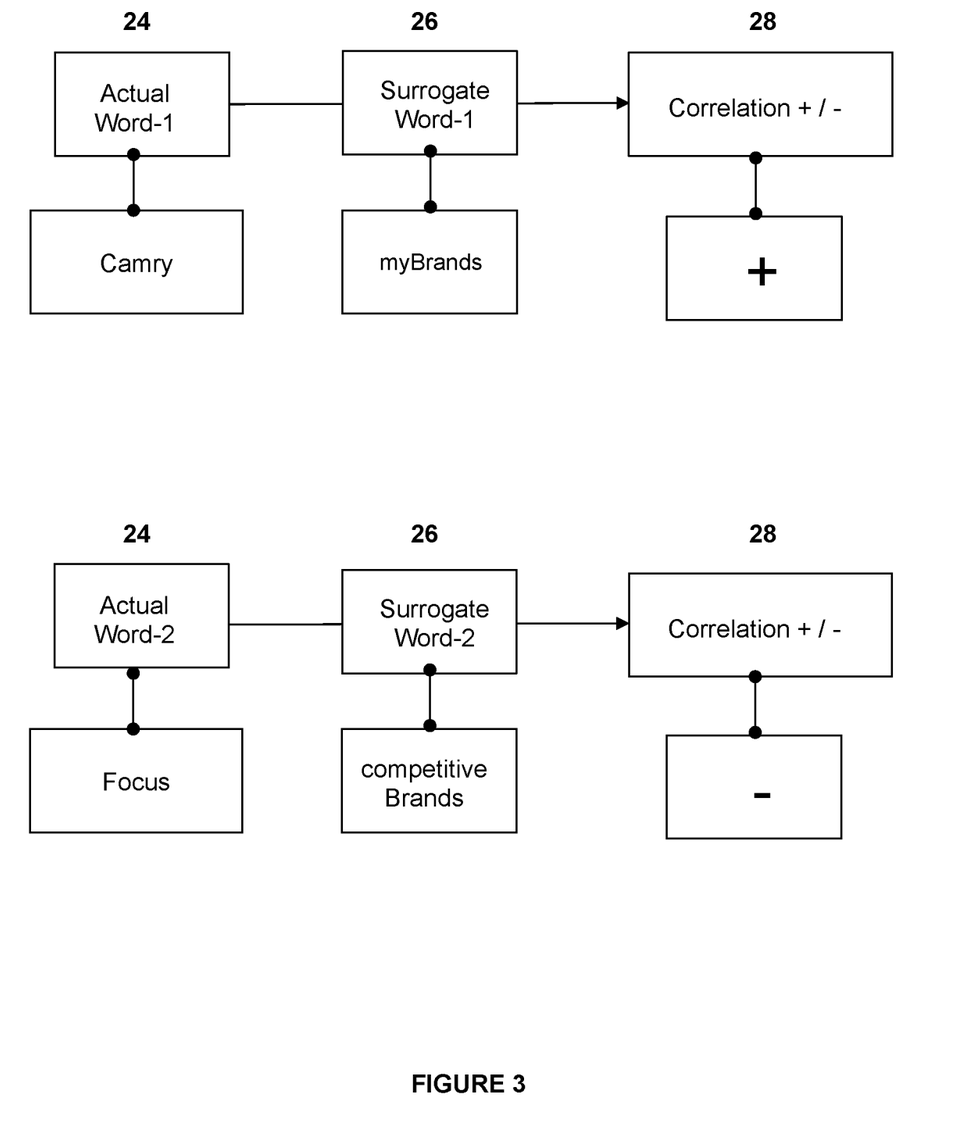
FIG. 3 is another diagram that illustrates the association between actual/specific words detected by the system, surrogate words, and correlative meanings assigned to the surrogate words.

Referring now to FIGS. 2 and 3, according to certain preferred embodiments, the invention provides that the feature abstraction module 16 is configured to receive instructions that identify specific/actual words 24 within certain written transcripts; replace the specific/actual words 24 with surrogate words 26; and associate correlative meanings 28 with each of the surrogate words 26. For example, as explained above, the articulation of a specific brand or model name, i.e., a specific/actual word 24, may be correlated with a desired likelihood (e.g., >50%) of a sale if that brand or model name is offered by the user-vendor; whereas, the articulation of the same specific brand or model name may be correlated with a low likelihood (e.g., <50%) of a sale if that brand or model name is offered by a competitor. Thus, whether the same brand or model name should be positively or negatively correlated depends on the context in which such specific word is used and the identity of the user (i.e., whether the brand or model name is associated with the user or its competitor). The feature abstraction module 16 enables a user to dynamically assign generic/surrogate words 26 (e.g., "myBrand" or "competitorBrand") to specific/actual words 24 (e.g., a particular brand or model name), along with corresponding correlative meanings 28 (FIGS. 2 and 3). The correlative meanings 28 associated with each of the surrogate words 26 will be context-dependent and, in certain embodiments, such correlative meanings 28 will be subject to a binary classification, with each class represented by either positive or negative values.

For example, the systems of the present invention enable the correlation module 14, after it has been trained using a training set 22 (e.g., transcribed conversations with prospective customers) for a first car dealer, to be effectively used by a different/second car dealer, without needing to be re-trained on another training set 22 from the second car dealer. More specifically, in this example, specific/actual words 24 detected in a written transcript, such as model and brand name features, can be removed from the training sets 22 and replaced with dynamic surrogate words 26, which would capture the important semantic context without being unduly specific (i.e., associated with just one car dealer).

Referring to FIG. 3, for example, in the case of a Toyota dealer, if a prospective customer during a conversation mentions Corolla or Camry, such actual words 24 can be replaced with a surrogate word 26 (e.g., "myBrands"). Likewise, for a Ford dealer, the actual words 24 of Focus, Escape, and Fusion would be replaced with the surrogate word 26 "myBrands." Conversely, for the Toyota dealer, Focus, Fusion, and Escape would be substituted with the surrogate word 26 "competitiveBrands" and, for the Ford dealer, Corolla and Camry would be substituted with the surrogate word 26 "competitiveBrands." The replacement of actual words 24 with surrogate words 26 allows the correlation module 14 to be trained in a manner that is much less dependent on the user of the system—in the example above, the identity of the user/car dealer. According to certain preferred embodiments, the invention further provides that the feature abstraction module 16 may utilize other dynamic features, e.g., in the example above, the number of times that a particular user's (a car dealer's) models or brands are mentioned.

In the example above, for written transcripts 34 that the correlation module 14 associates with a product sale, the surrogate word 26 "myBrands" will have a positive correlative meaning 28. When such correlative meanings 28 are subject to binary classifications, the correlative meaning 28 in this instance will have positive values. Conversely, for written transcripts 34 that the correlation module 14 associates with a product complaint, the surrogate word 26 "myBrands" will have a negative correlative meaning 28. Here again, when such correlative meanings 28 are subject to binary classifications, the correlative meaning 28 in that instance will have negative values.

The invention provides that a key purpose of the surrogate words 26 employed in the systems described herein is to allow the contextual meaning and correlative meanings 28 of underlying specific terms to be inverted. In the example above, a Toyota dealer would use the surrogate word 26 "myBrands" for Camry, Corolla, Rav-4, etc.—and a user could assign a positive correlative meaning 28 to that surrogate word 26 in the context of sales conversations and callers inquiring about those car models. For a Ford dealer, the surrogate word 26 "myBrands" would be applied where a caller mentions Mustang, Ranger, Escort, etc. Accordingly, the system addresses the challenges associated with combining training content where words can have different meanings and significance depending on the context of the conversation—this is an important and advantageous aspect of the systems described herein. The system is configured to adapt to the fact that the correlative meaning 28 of Mustang can be positive for a Ford dealer and negative for a Toyota dealer.

Database

The invention provides that the surrogate word 26 substitutions, counts and other dynamic features will preferably be implemented through a pre-process that provides the system with, for example, a list of brands and models external to the trained model. The invention provides that such data may be housed within the database 18 described herein. For example, this pre-process would substitute actual words 24 (or actual word 24 count occurrences) of brand and model statements and pass that count as a feature into the correlation module 14. As explained above, a correlation module 14 configured in this manner could be trained on a single training set 22, e.g., a set of transcribed conversations with prospective customers associated with a single vendor (e.g., a single car dealer), and used by multiple different users/car dealers. Referring to the example above, the correlation module 14—when trained using transcribed customer calls with Toyota dealers involving a product sale—would have a positive correlation with myBrands (e.g., Corolla, Camry, etc.) and a negative correlation with competitiveBrands (e.g., Focus, Fusion, etc).

Figure 4:
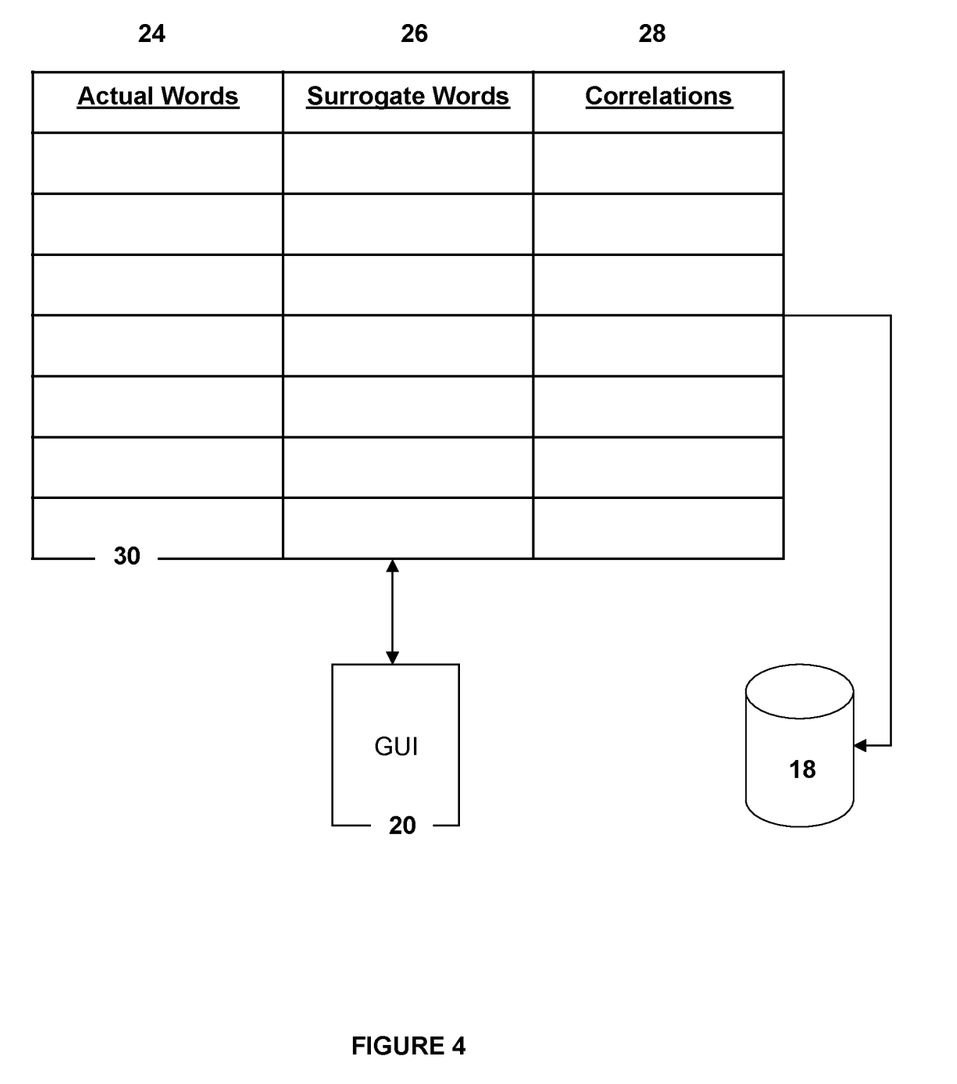
FIG. 4 is a diagram that illustrates a table included within the database of the system described herein, which is configured to receive, record, and make available to the system the associations between actual/specific words detected by the system, surrogate words, and the correlation data assigned to the actual words.

To adapt the correlation module 14 for use by another vendor (e.g., another car dealer), the only change required would be to change the external brand and model lists "myBrands" and "competitiveBrands." Referring to FIG. 4, for example, the invention provides that the database 18 of the systems descried herein is preferably configured to receive, record, and make accessible to the feature abstraction module 16 a table 30 of specific/actual words 24, each of which is associated with corresponding surrogate words 26, and correlative meanings 28 associated with each of the surrogate words 26. The invention provides that a user of the system may review, and make modifications as desired, to the table 30 of specific/actual words 24, surrogate words 26, and context-dependent correlative meanings 28 through a graphical user interface 20 of the system. This way, the correlation module 14 may be easily and quickly adapted to be used by different users of the system and in different contexts. The invention provides that such associations between specific/actual words 24 and surrogate words 26 may be based on known or anticipated correlative meanings 28—e.g., such correlative meanings 28 may be represented by either positive or negative values or, alternatively, such correlative meanings 28 may be represented by numeric probabilities, such as >50% chance of producing a sale (+) or <50% chance of producing a sale (−)(FIGS. 3 and 4).

Data Sources

In certain embodiments, the invention provides that data from multiple sources may be combined into a training set 22 by first normalizing the data by conditionally substituting, for example, "myBrands" and "competitiveBrands" based on the source of the data. As such, the invention provides that data from a first user (e.g., Toyota) and data from a second user (e.g., Ford) can be combined into a larger training set 22, without the compromising effect of the confusion between positively and negatively correlated actual words 24 in the contexts of the data collected from the different users. In addition, the invention provides that the required training sets 22 will be more flexible to changes in brand and model names, without the cost of collecting more data and retraining the correlation module 14.

Although the present specification has made reference to car dealers to exemplify the operation of the systems described herein, those of ordinary skill in the art will appreciate that the systems and methods of the present invention may be used in connection with other types of users and in other industries. For example, the systems of the present invention may be used to improve performance of a correlation module 14 that is trained to predict aspects or outcomes of speech, text, or recordings pertaining to sales leads in other industries, e.g., home services, professional services, etc. In service-oriented applications, for example, a list of specific/actual words 24 might be replaced with surrogate words 26 such as "myServices" or, for competitors, "competingServices."

Of course, the dynamic features of the present invention can also be used in applications other than identifying and scoring sales leads. Indeed, the benefits provided by the subject invention can be realized in any application where there are some words in common, which have a consistently positive or negative correlations, and other groups of words that may "flip" between positive or negative correlations for specific subsets of calls, data, and users—despite the fact that the "flipped" words may be assigned relatively similar semantic significance and weights in the correlation module 14.

Referring again to FIG. 4 and the database 18 described herein, a user of the system may create a somewhat comprehensive and genericized list of actual words 24, which will be replaced with generic positive (myPositiveWords) or negative (myNegativeWords) surrogate words 26. Furthermore, the user of the system may assign a desired correlative meaning 28 to the surrogate words 26—e.g., a positive or negative value; a numeric probability; etc. A training set 22 that incorporates the surrogate words 26 may then be used to train the correlation module 14, such that the correlation module 14 will then be configured to analyze sample data 24 for the particular user (and/or other similarly-situated users, since important actual words 24 will have been replaced with generic surrogate words 26).

The invention further provides that the population of specific/actual words 24, surrogate words 26, and corresponding correlative meanings 28 may be obtained and/or inspired by a variety of sources—including sources that are internal and/or external to a particular user. For example, in some cases, the specific/actual words 24, surrogate words 26, and corresponding correlative meanings 28 may be sourced from or pertain to standardized service or product categories. In other examples, the specific/actual words 24, surrogate words 26, and corresponding correlative meanings 28 may incorporate industry codes, such as North American Industry Classification System (NAICS) and Standard Industrial Classification (SIC) codes.

Transcription Module

Figure 5:
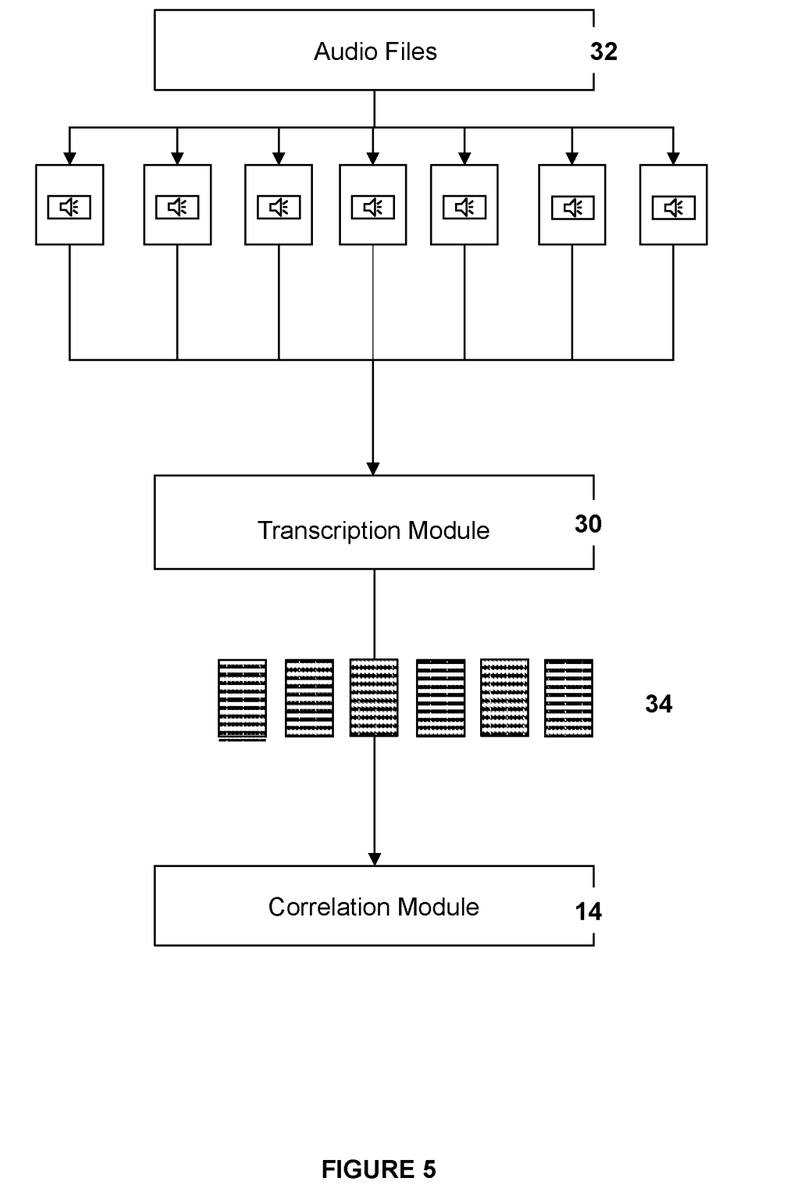
FIG. 5 is a diagram that illustrates the transcription module of the system, as described herein.

Referring now to FIG. 5, according to yet additional embodiments, the invention provides that the system may further include its own transcription module 30. In such embodiments, the transcription module 30 is configured to receive a plurality of audio files 32 generated by a plurality of different sources (e.g., different conversations), and to execute speech-to-text transcriptions based on the audio content included within the audio files. The transcription module 30 is configured to then generate written transcripts 34 of such transcriptions, and transmit such written transcripts 34 to the correlation module 14. The invention provides that the speech-to-text transcriptions may be executed in real-time, e.g., as audio content is being created and captured by a microphone (and streamed to the system). In other embodiments, the transcription module 30 may be provided with a set of audio files that were created over a period of time (i.e., a previously recorded set of audio files may be digitally transmitted to the system).

The invention provides that the written transcripts 34 may be formatted as simple contiguous text or, in other embodiments, the written transcripts 34 may be formatted as arrays. In addition, the invention provides that the transcription module 30 may utilize a variety of algorithms during a transcription procedure, including, but not limited to, algorithms that may be used to perform speech-to-text, speech-to-phoneme, speech-to-syllable, and/or speech-to-subword conversions. In certain embodiments, Hidden Markov Model algorithms may be employed to execute the transcriptions.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A system for analyzing and categorizing audio content that has been transcribed into text, which comprises at least one machine that includes a central processing unit, random access memory, one or more microphones, a transcription module, a correlation module, a feature abstraction module, and at least one database in communication with the machine, wherein:

(a) the transcription module is configured to (i) receive a plurality of audio files generated by a plurality of different sources through the one or more microphones, (ii) execute speech-to-text transcriptions based on audio content included within the audio files, (iii) generate written transcripts of such transcriptions, and (iv) provide the written transcripts to the correlation module;

(b) the correlation module is configured to (i) receive the written transcripts, each of which has been generated from the audio content, and (ii) derive a correlation between each written transcript and one or more attributes, wherein the one or more attributes include a first attribute associated with a customer who is likely to purchase a product or service and a second attribute associated with a customer who is not likely to purchase a product or service;

(c) the feature abstraction module is configured to receive instructions that (i) identify specific words within the written transcripts, (ii) replace the specific words with surrogate words, and (iii) associate correlative meaning with each of the surrogate words, wherein (x) the surrogate words are configured to be used by multiple and different users of the system, (y) the correlative meaning associated with each of the surrogate words is context-dependent, and (z) the correlative meaning is subject to a binary classification, with each class represented by either positive or negative values; and (d) the database is configured to receive, record, and make accessible to the feature abstraction module a table of specific words, each of which is associated with corresponding surrogate words, with each of the surrogate words associated with the context-dependent correlative meanings.

2. The system of claim 1, wherein the system is configured to associate (a) specific words with surrogate words and (b) surrogate words with corresponding correlative meanings prior to, during, or following analysis by the correlation module of the written transcripts.

3. The system of claim 2, wherein the system is configured to associate specific words with surrogate words based on known or anticipated correlative meanings.

4. The system of claim 3, wherein (a) the transcription module is configured to execute speech-to-text transcriptions of recorded audio content and (b) the correlation module is configured to derive the correlation between each written transcript and one or more attributes at any time thereafter.

5. The system of claim 3, wherein (a) the transcription module is configured to execute speech-to-text transcriptions of live audio content in real-time and (b) the correlation module is configured to derive the correlation between each written transcript and one or more attributes in real-time, as the transcription module is executing such speech-to-text transcriptions.

6. The system of claim 3, wherein the specific words are brand names, product model names, or combinations thereof.

7. The system of claim 3, wherein the correlation module, feature abstraction module, transcription module, and database exist within two or more separate machines.

8. The system of claim 3, wherein the correlation module, feature abstraction module, transcription module, and database exist within a single unified machine.

9. The system of claim 1, which further comprises a graphical user interface that is configured to display (a) correlations between each written transcript and one or more attributes and (b) the table of specific words housed within the database.

* * * * *